United States Patent [19]

Bopp

[11] Patent Number: 5,700,558
[45] Date of Patent: Dec. 23, 1997

[54] HYDROCARBON ABSORBENT

[76] Inventor: Alvin F. Bopp, 5828 Chatham Dr., New Orleans, La. 70122

[21] Appl. No.: 569,978

[22] Filed: Dec. 8, 1995

[51] Int. Cl.$^6$ .................... B32B 3/26; B32B 5/16
[52] U.S. Cl. ................ 428/316.6; 428/326; 523/200
[58] Field of Search ................ 428/316.6, 326; 523/200

[56] References Cited

U.S. PATENT DOCUMENTS

| | | | |
|---|---|---|---|
| 3,657,125 | 4/1972 | Strickman | 210/40 |
| 4,460,292 | 7/1984 | Durham et al. | 405/129 |
| 5,062,996 | 11/1991 | Kaylor | 252/610 |
| 5,207,830 | 5/1993 | Cowan et al. | 106/672 |
| 5,421,897 | 6/1995 | Grawe | 134/6 |

Primary Examiner—Helen Lee
Attorney, Agent, or Firm—Pravel, Hewitt, Kimball & Krieger

[57] ABSTRACT

One embodiment of the present invention provides for a biodegradable absorbent material for oil or other hydrocarbon liquid spills. The material consists of a mixture of granulated foam, microbial nutrient, de-dust agent and ground cellulosic material. This mixture is superior to other absorbent mixtures because it biodegrades faster than other mineral or organic adsorbents and is less expensive than synthetic adsorbents on the market today. The material is useful in field operations, plants and shop or even home use. Another embodiment of the present invention, provides for a system for absorbing hydrocarbon based liquids spilled on a surface using the absorbent material described.

9 Claims, No Drawings

HYDROCARBON ABSORBENT

BACKGROUND OF THE INVENTION

This invention relates to a product that will efficiently absorb hydrocarbon based liquids, such as oil. More specifically, the invention relates to a process for absorbing hydrocarbon based liquids into a biodegradable mass that can either be disposed of by incineration, in a landfill, or by biodegradation on the earth's surface.

There are a large number and variety of oil absorbents currently available. These oil absorbents are made of synthetic and natural materials. The synthetic materials, such as blown polypropylene, are designed and manufactured for a specific purpose and are very expensive. Natural materials can be either mineral, such as diatomaceous earth and calcined clay or organic such as sawdust and cotton, provide a low cost alternative to the synthetic oil absorbents. However, most natural materials currently available can either take a long time to biodegrade or do not biodegrade at all.

Bioremediation is an attractive choice for waste management because of increasingly strict emission and landfill regulations. A biodegradable absorbent material that is inexpensive to make and uses the soil to degrade oil or other hydrocarbon products would be very beneficial to many types of waste management programs around the world.

OBJECTS OF THE INVENTION

It is an object of the present invention to provide a biodegradable absorbent material that is inexpensive.

It is a further object of the present invention to provide a biodegradable absorbent material that may be disposed of by biodegradation, incineration, or landfill.

It is yet another object of the present invention to provide a biodegradable absorbent material that degrades quickly.

SUMMARY OF THE INVENTION

One embodiment of the present invention provides for a biodegradable absorbent material for oil or other hydrocarbon liquid spills. The material consists of a mixture of granulated foam, microbial nutrient, de-dust agent and ground cellulosic material. This mixture is superior to other absorbent mixtures because it biodegrades faster than other mineral or organic adsorbents and is less expensive than synthetic adsorbents on the market today. The material is useful in field operations, plants and shop or even home use.

Another embodiment of the present invention, provides for a system for absorbing hydrocarbon based liquids spilled on a surface. This system involves the steps of covering the hydrocarbon based liquid with an absorbent material. The material consists of a mixture of granulated foam, microbial nutrient, de-dust agent and ground cellulosic material. The absorbent material immobilizes contamination and promotes biodegradation of hydrocarbon based liquids over time. The material is then mixed with the hydrocarbon liquid and the adsorbent material is allowed to absorb the hydrocarbon based liquid. Once the liquid is adsorbed from a spill on soil, end result is a mass of soil-colored material that can be disposed of by biodegradation, incineration, or landfill. The mass of soil-colored material has cosmetic as well as environmentally friendly features. The adsorbent material contains microbial nutrients that boost the naturally occurring microbes in the soil to biodegrade the hydrocarbon liquid.

DETAILED DESCRIPTION OF THE PREFERRED EMBODIMENTS

One embodiment of the present invention provides for a biodegradable absorbent material for oil or other hydrocarbon based liquid spills. The material consists of a mixture of granulated foam, microbial nutrient, de-dust agent and ground cellulosic material. The mixture can be granular or in pelletized form depending on the application. This mixture is superior to other absorbent mixtures because it biodegrades faster than other mineral and organic adsorbents and is less expensive than synthetic adsorbents on the market today. The material is useful in field operations, plants and shops or even home use. Preferably, the material has an absorption capacity for hydrocarbon based liquids of about 2.5 to about 6.5 grams of hydrocarbon based liquid per gram of absorbent material with about 4 grams being the preferred adsorption capacity.

In the present embodiment, the absorbent material can be from about 6% to about 15% by weight granulated foam, preferably about 10%. The granulated foam can be urea-formaldehyde foam or polyurethane foam or a mixture of the two foams. In a preferred embodiment of the invention, urea-formaldehyde foam is provided by Environmental Foam of Skokie, Ill. Urea-formaldehyde foam is preferred because it has a superior absorption capacity when compared to other foams. The foam is granulated by pulverizing and passing the foam through a perforated plate having 0.25 inch holes.

In a preferred embodiment, the material has varying amounts of ground cellulosic material, nutrient and de-dust agent. The absorbent material is approximately 79-93% cellulosic material. The cellulosic material can be rice hulls, cotton linters, corn cobs, peat moss, ground pine, pure α-cellulose, or mixtures thereof. The absorbent material can be at a concentration of from about 0.1 to 1% by weight microbial nutrient. In a preferred embodiment, the microbial nutrient used is supplied by Bio-Nutratech of Houston, Tex. and is sold under the name "VitaBugg" (U.S. Pat. No. 5,443,845). Other possible microbial nutrients can be obtained from BioGenesis Enterprises of Austin, Tex. and ESP Corporation of Arlington, Tex. The absorbent material can contain up to about 5% de-dust agent. The range of de-dust agent can be anywhere from 0.1 to 5% but is preferably between about 2 and 3.5%. The de-dust agent can be mineral oil, rice bran oil or a vegetable oil. Some examples of vegetable oil are: canola, soy, olive, peanut, coconut, or corn oil. Alternatively, the de-dust agent can be molasses or corn syrup.

The cellulosic material and the foam used in the present invention can be ground in several ways. In a preferred embodiment where rice hulls were used as the cellulosic material, the grinding step was accomplished by passing rice hulls through a hammer mill to break up the hulls and screens having opening sizes of 0.07031 inches and 0.09375 inches. The foam can be ground by shredding it in a snow cone maker followed by passing the foam through a screen having an opening size of 1 millimeter. Ultimately, the density of the foam used is between 0.8 and 1 pound per cubic centimeter. Alternatively, the foam can be passed through a Model D Fitz Mill having a 0.25 inch perforated plate. (Provided by Fitzpatrick Co. of Elmhurst, Ill.). Any of these methods can be modified for large scale manufacturing.

The absorbent material further may contain an abrasive material such as clay, sand, glass, silicate, marble, ground nut shells, calcium carbonate or mixtures thereof added to the mixture of adsorbent material. The abrasives aid in hydrocarbon liquid removal when the product is used on concrete or a similar hard surface. The addition of abrasives tends to lower the absorbent capacity of the material and the ability of the material to biodegrade if non-biodegradable abrasives are used.

Another embodiment of the present invention, provides for a system for absorbing hydrocarbon based liquids spilled on a surface. This system involves the steps of covering the hydrocarbon based liquid with an absorbent material. The material consists of a mixture of granulated foam, microbial nutrient, de-dust agent and ground cellulosic material. The absorbent material promotes biodegradation of hydrocarbon based liquids over time. The material is then mixed with the hydrocarbon liquid and the adsorbent material is allowed to absorb the hydrocarbon based liquid. Once the liquid is adsorbed, end result is a mass of soil-colored material that can be disposed of by biodegradation, incineration, or landfill. The adsorbent material contains microbial nutrients that boost the naturally occurring microbes in the soil to biodegrade the hydrocarbon liquid.

The absorbent material can have an abrasive material such as clay, sand, glass, silicate, marble, ground nut shells, calcium carbonate or mixtures thereof. The abrasives aid in hydrocarbon liquid removal when the product is used on concrete or a similar hard surface. The addition of abrasives tends to lower the absorbent capacity of the material and the ability of the material to biodegrade if non-biodegradable abrasives are used.

Preferably, the absorbent material contains about 10% by weight granulated foam, about 1% by weight microbial nutrient, and about 2% to 3.5% de-dust agent. The absorbent material can have an absorption capacity for hydrocarbon based liquid of 4 grams of hydrocarbon based liquid per gram of absorbent material. The cellulosic material can be rice hulls, cotton linters, corn cobs, peat moss, ground pine, pure α-cellulose, or mixtures thereof.

EXAMPLE

The following examples are included as illustrations but are not intended to limit the scope of the claims. Three formulations are described below.

Several blends of adsorbent material were formulated and tested. The foam content varied from 7 to 12%. The ground cellulosic material used consisted of rice hulls passed through a 0.09375 inch screen. The foam and the rice hulls were granulated as described above and mixed. The 7% foam material had density of 0.170 g/cm³ and an absorbency of 3.7 grams of hydrocarbon liquid per gram of absorbent material. As the foam content increased the absorbency increased. At 9% foam content, the absorbency was 4.1 and at 10% foam the absorbency was 4.3. (See Table 1). Other formulations were made using de-dust and nutrient with no appreciable change in the density or absorbency. The de-dust agent was added by dropping the mixture through a mist of the de-dust agent. Nutrient was added by pre-blending with the rice hulls.

Another formulation was tested comprising 10% foam plus cotton linters as the cellulosic material. The cotton linter/foam formulation yielded an absorbency of 3.7 grams of hydrocarbon liquid per gram of adsorbent material and a density of 0.168 g/cm³.

TABLE 1

| % Foam | 7 | 8 | 9 | 10 | 11 | 12 |
|---|---|---|---|---|---|---|
| Density | .170 | .167 | .150 | .148 | .148 | .151 |
| Absorbency | 3.7 | 3.7 | 4.1 | 4.3 | 4.5 | 4.2 |

What is claimed is:

1. An absorbent material comprising:

a mixture of granulated foam, microbial nutrient, de-dust agent and ground cellulosic material, wherein;
  the granulated foam is selected from the group consisting of urea-formaldehyde foam and polyurethane foam,
  the absorbent material is about 6% to about 15% by weight granulated foam,
  the absorbent material is about 0.1% to 1% by weight microbial nutrient,
  the microbial nutrient is a composite material for promoting growth of hydrocarbon degrading microorganisms, comprising:
    a core having water soluble, microbial available nutrients, wherein said nutrients include nitrogen in the form of an ammonium compound, phosphorous in the form of a microbial available phosphate compound, and iron in a form of microbial available iron compound; and
    a sacrificial oleophilic, lipophilic, partially oil soluble and biodegradable coating having a saturated fatty acid and an unsaturated fatty acid, wherein said coating encapsulates said core, and the absorbent material is about 79% to 93% by weight cellulosic material.

2. The material of claim 1, wherein the absorbent material is about 10% by weight granulated foam.

3. The material of claim 1, wherein the absorbent material comprises up to about 5% de-dust agent.

4. The material of claim 3, wherein the absorbent material is about 2% to 3.5% de-dust agent.

5. The material of claim 1, wherein the de-dust agent is selected from the group consisting of mineral oil, rice bran oil and vegetable oil.

6. The material of claim 1, having an absorption capacity for hydrocarbon based liquid of about 2.5 to about 6.5 grams of hydrocarbon based liquid per gram of absorbent material.

7. The material of claim 1, having an absorption capacity for hydrocarbon based liquids of about 4 grams of hydrocarbon based liquid per gram of absorbent material.

8. The material of claim 1, wherein the cellulosic material is selected from the group consisting of rice hulls, cotton linters, corn cobs, peat moss, ground pine, and pure α-cellulose, and mixtures thereof.

9. The material of claim 1, having the characteristic of pellets.

* * * * *